United States Patent [19]
Udall et al.

[11] Patent Number: 5,409,184
[45] Date of Patent: Apr. 25, 1995

[54] MOUNTING FOR COUPLING A TURBOFAN GAS TURBINE ENGINE TO AN AIRCRAFT STRUCTURE

[75] Inventors: Kenneth F. Udall, Derbyshire; Eric Wright, Nottinghamshire; David D. K. Drew, Derby, all of England

[73] Assignee: Rolls-Royce plc, London, England

[21] Appl. No.: 193,857

[22] Filed: Feb. 9, 1994

[30] Foreign Application Priority Data

Feb. 20, 1993 [GB] United Kingdom ............. 9303468

[51] Int. Cl.6 .................. F02C 7/20; B64D 27/18; B64D 27/26
[52] U.S. Cl. ..................... 244/54; 60/39.31; 248/555
[58] Field of Search .............. 244/54; 248/554, 555, 248/556, 557; 60/39.31

[56] References Cited

U.S. PATENT DOCUMENTS

| | | | |
|---|---|---|---|
| 4,603,821 | 8/1986 | White | 248/554 |
| 5,078,342 | 1/1992 | Langley et al. | 244/54 |
| 5,181,675 | 1/1993 | Lardellier et al. | 244/54 |
| 5,284,011 | 2/1994 | Von Benken | 248/554 |

FOREIGN PATENT DOCUMENTS

| | | |
|---|---|---|
| 0147878 | 7/1985 | European Pat. Off. . |
| 1504290 | 3/1978 | United Kingdom ............. 60/39.31 |
| 2215290 | 9/1989 | United Kingdom . |

*Primary Examiner*—William Grant
*Attorney, Agent, or Firm*—Cushman, Darby & Cushman

[57] ABSTRACT

A turbofan gas turbine engine is provided with a polygonal rigid frame formed by a hub member, a plurality of radially extending spokes and a plurality of straight members connect to the radially outer ends of the spokes. The hub member is secured to the core casing and the straight members are secured to the core casing and the straight members are secured to the fan casing. Brackets are provided at two hard points at the radially outer ends of two adjacent hard points at the radially outer end of two adjacent spokes and brackets are provided at two hard points at the radially inner ends of two other spokes. The spokes have a chord length of six times that of conventional outlet guide vanes. The hard points are connected by links to a bracket at a first axial position on the aircraft stub pylon extension and the hard points are connect by links to a bracket at a second axial position on the stub pylon extension to form a rigid triangular structure to mount the engine from the aircraft.

22 Claims, 5 Drawing Sheets

MOUNTING FOR COUPLING A TURBOFAN GAS TURBINE ENGINE TO AN AIRCRAFT STRUCTURE

The present invention relates to a mounting for coupling a turbofan gas turbine engine to an aircraft structure.

In one conventional high bypass ratio turbofan gas turbine engine, in which the fan assembly is positioned upstream of the core engine, the engine is mounted onto an aircraft pylon by upstream and downstream mounting means. The upstream and downstream mounting means are positioned adjacent to the fan assembly and the turbines of the core engine respectively. Furthermore the fan casing of the turbofan gas turbine engine is supported from the core engine by support means.

In another conventional high bypass ratio turbofan gas turbine engine, in which the fan assembly is positioned upstream of the core engine, the engine is mounted onto an aircraft pylon by upstream and downstream mounting means. The upstream mounting means is provided on the fan casing and the downstream mounting means is provided adjacent the turbines on the core engine casing.

These conventional mountings require "A" frames between the fan casing and the core casing, and downstream mountings on the core engine casing.

The present invention seeks to provide a novel mounting for coupling a turbofan gas turbine engine to an aircraft structure which does not require "A" frames or a downstream mounting on the core engine casing.

Accordingly the present invention provides a mounting for coupling a turbofan gas turbine to an aircraft structure, the turbofan gas turbine having an axis and comprising a core engine and a fan, the core engine having compressor means, combustor means, turbine means and a core casing, the fan operating within a fan duct defined in part by a fan casing, a rigid frame being defined by a hub member, a plurality of angularly spaced spokes secured at their radially inner ends to and extending radially outwardly from the hub member and an annular member secured to the radially outer ends of the spokes, the annular member being formed integral with or being secured to the fan casing, the hub member being formed integral with or being secured to the core casing, first connecting means connecting a first axial position on the aircraft structure with the radially outer ends of two adjacent spokes forming the rigid frame, second connecting means connecting a second axial position on the aircraft structure with the hub member forming the rigid frame, the first and second axial positions on the aircraft structure being in a plane containing the axis of the turbofan gas turbine engine, the rigid frame, the first connecting means, the aircraft structure and the second connecting means forming a rigid triangular structure to mount the turbofan gas turbine engine from the aircraft structure.

Preferably the rigid frame is removably connected to the first connecting means at the radially outer ends of the two adjacent spokes.

Preferably the second connecting means is removably connected to the aircraft structure at the aircraft structure. Preferably the spokes are equi-angularly spaced. Preferably the spokes are outlet guide vanes.

Preferably the outlet guide vanes have a long chord length relative to conventional outlet guide vanes. There may be seven outlet vanes having a chord length of six times the chord length of conventional outlet guide vanes. There may be eight outlet vanes having a chord length of five times the chord length of conventional outlet guide vanes. There may be six outlet vanes having a chord length of seven times the chord length of conventional outlet guide vanes. There may be nine outlet vanes having a chord length of between four and five times the chord length of conventional outlet guide vanes.

Preferably the annular member comprises a plurality of members, each member is substantially straight in a direction peripherally of the fan casing and connects the radially outer ends of two adjacent spokes to define a polygonal rigid frame.

Preferably the second connecting means connects the second axial position on the aircraft structure with the radially inner ends of two spokes. Preferably the second connecting means connects the second axial position on the aircraft structure with the radially inner ends of two spokes other than said two adjacent spokes secured at their radially outer ends to the first connecting means.

Preferably the second connecting means are connected to the two spokes having radially inner ends nearest to, or in, a plane containing the engine axis and perpendicular to the plane containing the engine axis and the first and second axial positions on the aircraft structure.

The aircraft structure may be a stub pylon extension or a wing box.

Preferably the first connecting means comprises a first link connecting the first axial position on the aircraft structure and the radially outer end of one of the two adjacent spokes, and a second link connecting the first axial position on the aircraft structure and the radially outer end of the other of the two adjacent spokes.

Preferably the second connecting means comprises a third link connecting the second axial position on the aircraft structure and the radially inner end of one of the two spokes, and a fourth link connecting the second axial position on the aircraft and the radially inner end of the other of the two spokes.

Preferably third connecting means connects the radially outer ends of the two adjacent spokes forming the rigid with the first axial position on the aircraft structure.

Preferably the rigid frame is removably connected to the third connecting means at the radially outer ends of the two adjacent spokes.

Preferably the third connecting means comprises a fifth link connecting a first angular position and second radial position at the first axial position on the aircraft structure with the radially outer end of one of the two adjacent spokes, a sixth link connecting a second angular position and second radial position at the first axial position on the aircraft structure with the radially outer end of the other of the two adjacent spokes, and a seventh link connecting the first angular position and second radial position at the first axial position on the aircraft structure with the radially outer end of the other of the two adjacent spokes.

The present invention will be more fully described by way of example with reference to the accompanying drawings, in which.

Figure 1:
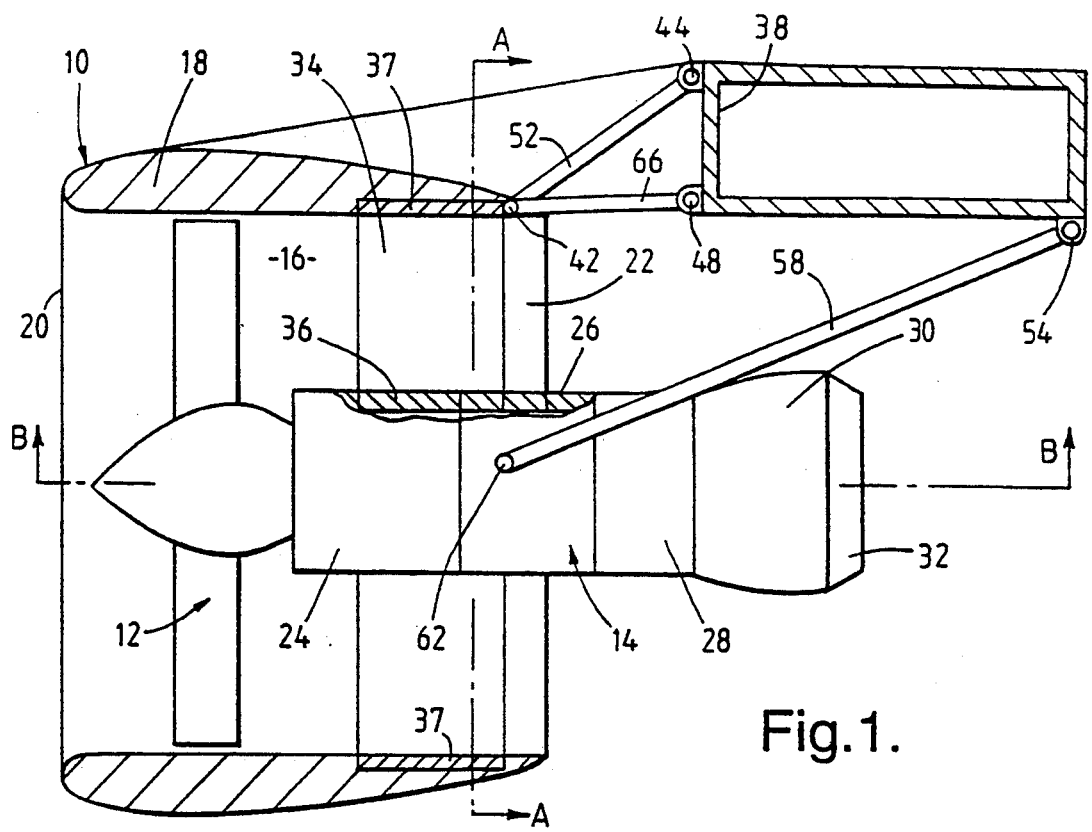
FIG. 1 is a longitudinal part cross-sectional view through a turbofan gas turbine engine having a mounting according to the present invention.
Figure 2:
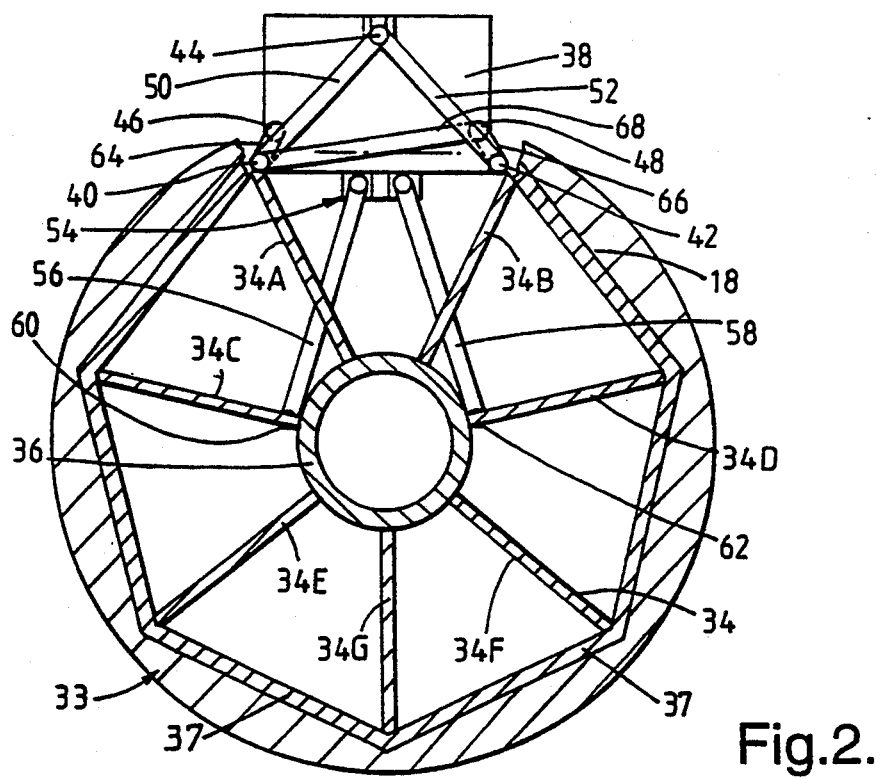
FIG. 2 is a cross-sectional view in the direction of arrows A—A in FIG. 1.
Figure 3:
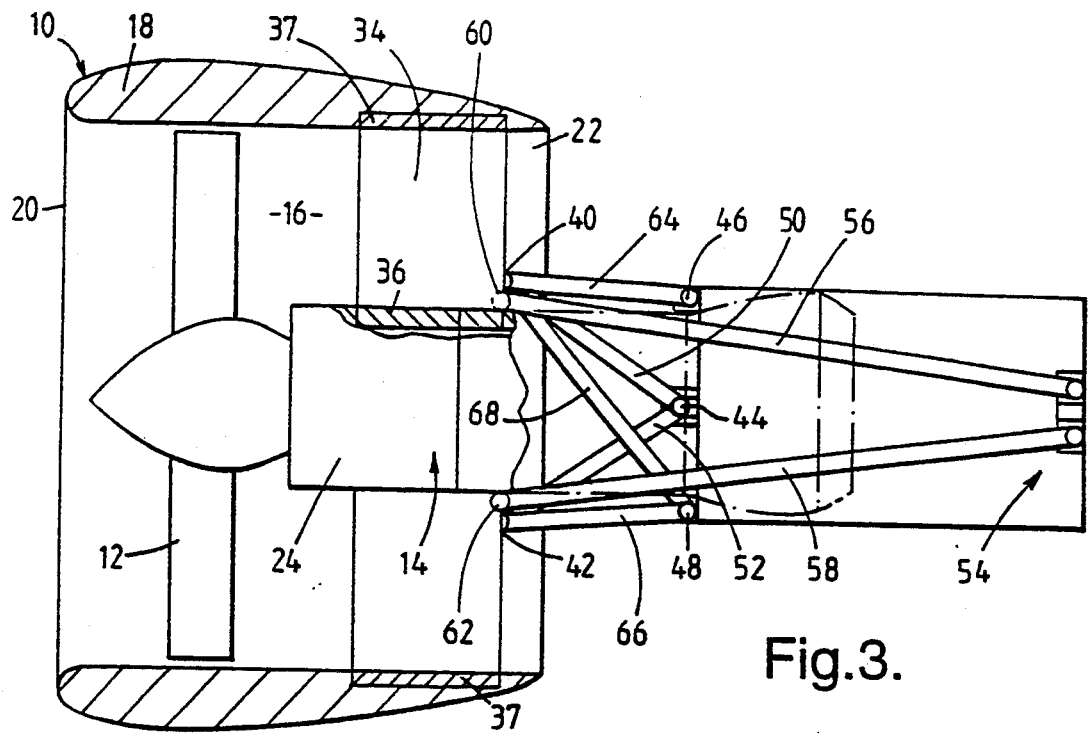
FIG. 3 is a part cross-sectional view in the direction of arrows B—B in FIG. 1.

A high bypass ratio turbofan gas turbine engine 10 is shown in FIGS. 1 to 3, and comprises a fan assembly 12 and a core engine 14. The fan assembly 12 is positioned upstream of the core engine 14. The fan assembly is arranged in a fan duct 16 defined in part by a fan casing 18, the fan duct 16 has an inlet 20 at its upstream end and a fan outlet nozzle 22 at its downstream end. The fan assembly 12 is driven by the core engine 14.

The core engine 14 comprises in axial flow series an intermediate pressure compressor 24, a high pressure compressor 26, a combustor means 28, a turbine means 30 and a core exhaust nozzle 32. A portion of the air initially compressed by the fan assembly 12 flows through the intermediate and high pressure compressors 24, 26 to the combustor means 28, which may be an annular combustor or a can-annular combustor. Fuel is burnt in the combustor means 28 to produce hot gases which flow through the turbine means 30. The turbine means 30 drives the fan assembly 12, intermediate pressure compressor 24 and high pressure compressor 26 via respective shafts (not shown). The air driven through the nozzle 22 by the fan assembly 12 provides the majority of the thrust.

The fan casing 18 is interconnected to the core engine casing by a plurality of angularly spaced radially extending spokes 34, in this case outlet guide vanes, which are positioned downstream of the fan assembly 12.

The high bypass ratio turbofan gas turbine engine 10 is mounted onto an aircraft wing box, or stub pylon extension, 38 by a mounting to be described below.

In this, the preferred embodiment of the invention, a rigid frame 33 is define by a hub member 36, the angularly spaced spokes 34 which are secured at their radially inner ends to the hub member 36 and a plurality of members 37 which are substantially straight in a direction peripherally of the fan casing 18. The members 37 connect the radially outer ends of adjacent spokes 34 to define a polygonal rigid frame 33. The polygonal rigid frame 33 resolves individual components of loads and enables a very stiff and light frame to be produced. The spokes 34 have a relatively long chord length compared to conventional outlet guide vanes. In this example there are seven equi-angularly spaced spokes 34, which have a chord length of six times that of conventional outlet guide vanes, i.e. spokes 34 have a chord length of approximately 72 inches (183 cm). These spokes 34 have the same space chord and the same total chord as conventional sets of forty outlet guide vanes with a chord length of 12 inches (30 cm). The use of the longer chord spokes 34 produces a much stiffer structure, i.e approximately 216 times stiffer than conventional outlet guide vanes.

The straight members 37 of the polygonal rigid frame 33 are formed integrally with, or are secured to, the fan casing 18 and the hub member 36 is formed integrally with, or is secured to, the core casing.

The polygonal rigid frame 33 is provided with two angularly spaced brackets at hard point 40 and 42 at the radially outer ends of two adjacent spokes 34A and 34B, and has two angularly spaced brackets at hard points 60 and 62 at the radially inner ends of two other spokes 34C and 34D. The hard points 40, 42, 60 and 62 are provided at the downstream end of the spokes 34, and it is to be noted that the hard points 40, 42, 60, and 62 are all in a single plane perpendicular to the engine axis. The wing box, or stub pylon extension, 38 has three brackets 44, 46 and 48 at a first axial position relative to the engine axis. The brackets 46 and 48 are angularly spaced relative to the engine axis and are at a radial position closer to the engine axis than the bracket 44. The wing box, or stub pylon extension, 38 also has a bracket 54 at a second axial position relative to the engine axis and substantially at the same radial position as brackets 46 and 48. When the turbofan gas turbine engine 10 is mounted on the wing box, or stub pylon extension, 38 the brackets 44 and 54 are substantially in a plane containing the engine axis.

A first link 50 connects the bracket 44 on the wing box, or stub pylon extension, 38 and the bracket at the hard point 40 at the radially outer end of one 34A of the two adjacent spokes 34A and 34B. Similarly a second link 52 connects the bracket 44 and the bracket at the hard point 42 at the radially outer end of the other 34B of the two adjacent spokes 34A and 34B.

A third link 56 connects the bracket 54 on the stub pylon extension 38 and the bracket at the hard point 60 at the radially inner end of one 34C of the two other spokes 34C and 34D. Similarly a fourth link 58 connects the bracket 54 and the bracket at the hard point 62 at the radially inner end of the other 34D of the two other spokes 34C and 34D. It is to be noted that the links 56 and 58 must be connected to the radially inner ends of spokes 34 which are nearest to the plane containing the engine axis and which plane is perpendicular to the plane containing the engine axis and the brackets 44 and 54.

A fifth link 64 connects the bracket 46 on the wing box, or stub pylon extension, 38 and the bracket at the hard point 40. A sixth link 66 connects the bracket 48 on the wing box, or stub pylon extension, 38 and the bracket at the hard point 42 and a seventh link 68 connects the bracket 48 on the wing box, or stub pylon extension, 38 and the bracket at the hard point 40. It is possible to double up the first, second, fifth, sixth and seventh links by using coaxial links to provide failsafe features.

The side, vertical and axial loads and the yaw and roll couples are reacted by the brackets at the hard points 40 and 42 into the stub pylon extension 38. The pitch couples and thrust loads are reacted by the links 56 and 58 into the stub pylon extension 38.

Figure 4:
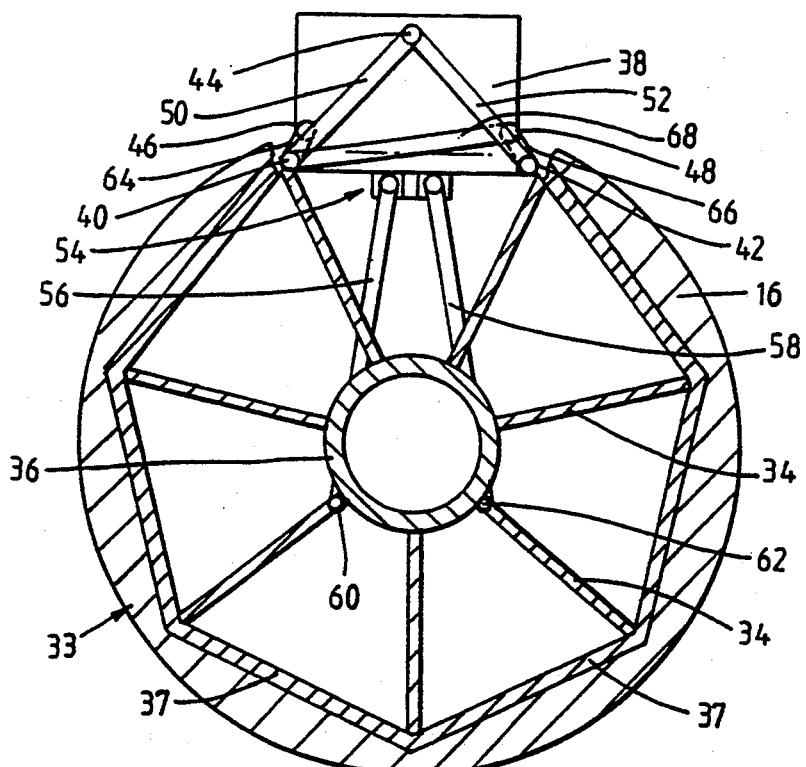
FIG. 4 is an alternative cross-sectional view in the direction of arrows A—A in FIG. 1.

The embodiment in FIG. 4 is similar to that shown in FIGS. 1 to 3, but the links 56 and 58 are connected to different spokes 34. In FIGS. 1 to 3 the links 56 and 58 are connected to the spokes 34C and 34D and these are equally as near to a plane containing the engine axis and perpendicular to the plane containing the brackets 44 and 54 as are spokes 34E and 34F, but they are above the plane. In FIG. 4 the links are connected to the spokes 34E and 34F and these are equally as near to a plane containing the engine axis and perpendicular to the plane containing the brackets 44 and 54 as are spokes 34C and 34D, but they are below the plane.

Figure 5:
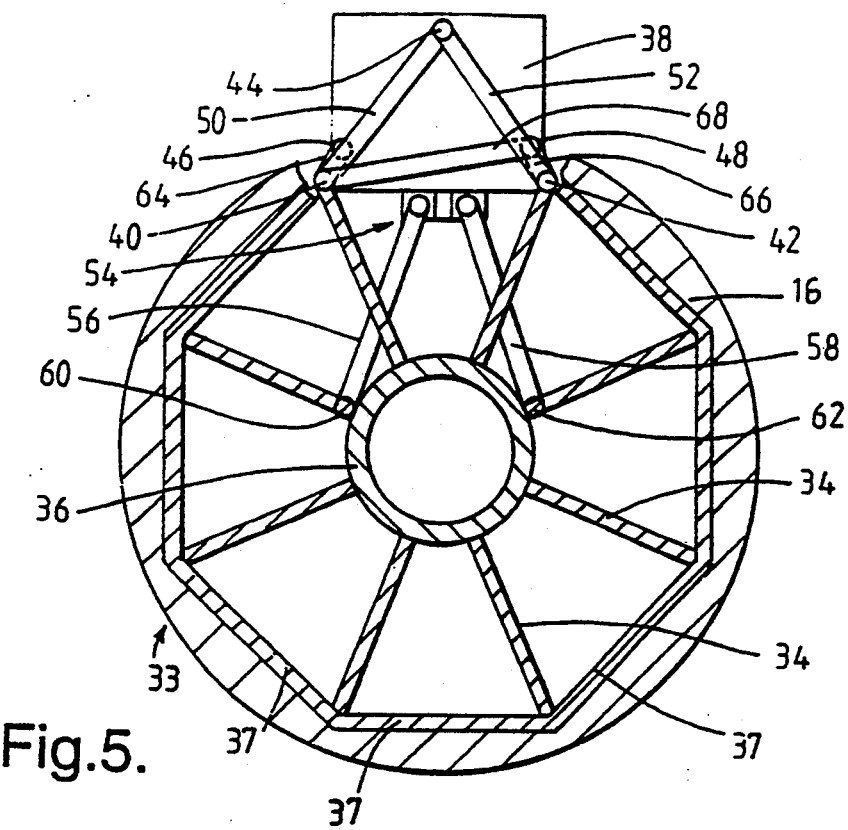
FIG. 5 is an alternative cross-sectional view in the direction of arrows A—A in FIG. 1.

The embodiment in FIG. 5 is similar to that shown in FIGS. 1 to 3 but there are eight equi-angularly spaced long chord spokes 34, which have a length of five times that of conventional outlet guide vanes, i.e. a length of approximately 60 inches (150 cm).

Figure 6:
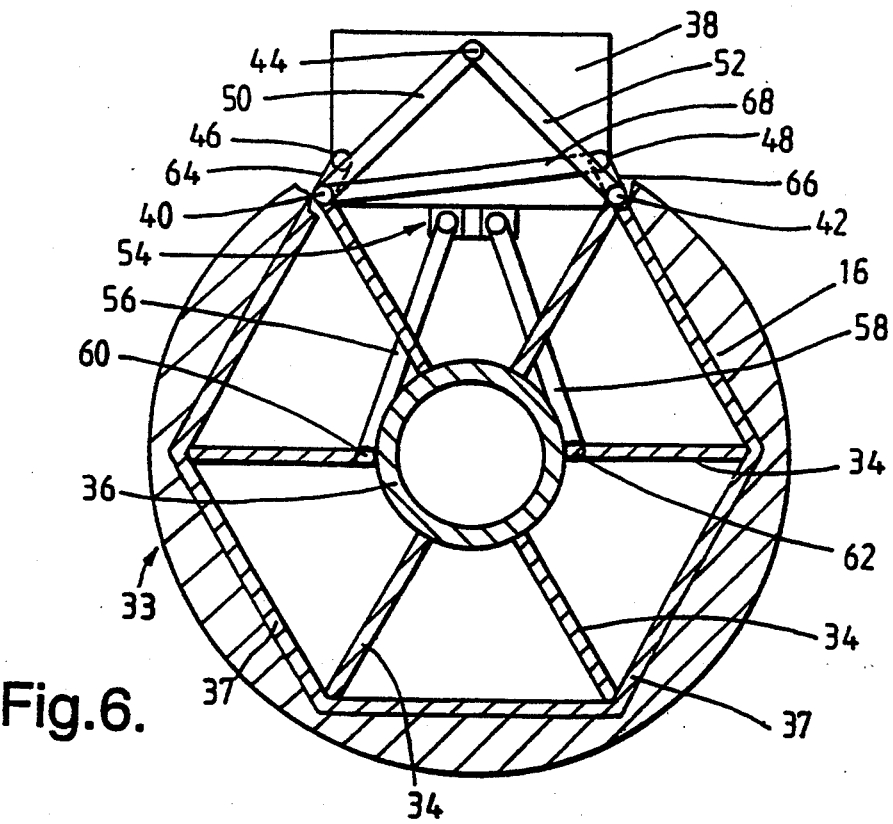
FIG. 6 is further alternative cross-sectional view in the direction of arrows A—A in FIG. 1.

The embodiment in FIG. 6 is similar to that shown in FIGS. 1 to 3 but there are six equi-angularly spaced long chord spokes 34, which have a length of seven times that of conventional outlet guide vanes, i.e. a length of approximately 84 inches (210 cm). Also the brackets at the hard point 60 and 62 are actually in a plane containing the engine axis and perpendicular to the plane containing the engine axis and the brackets 44 and 54.

Figure 7:
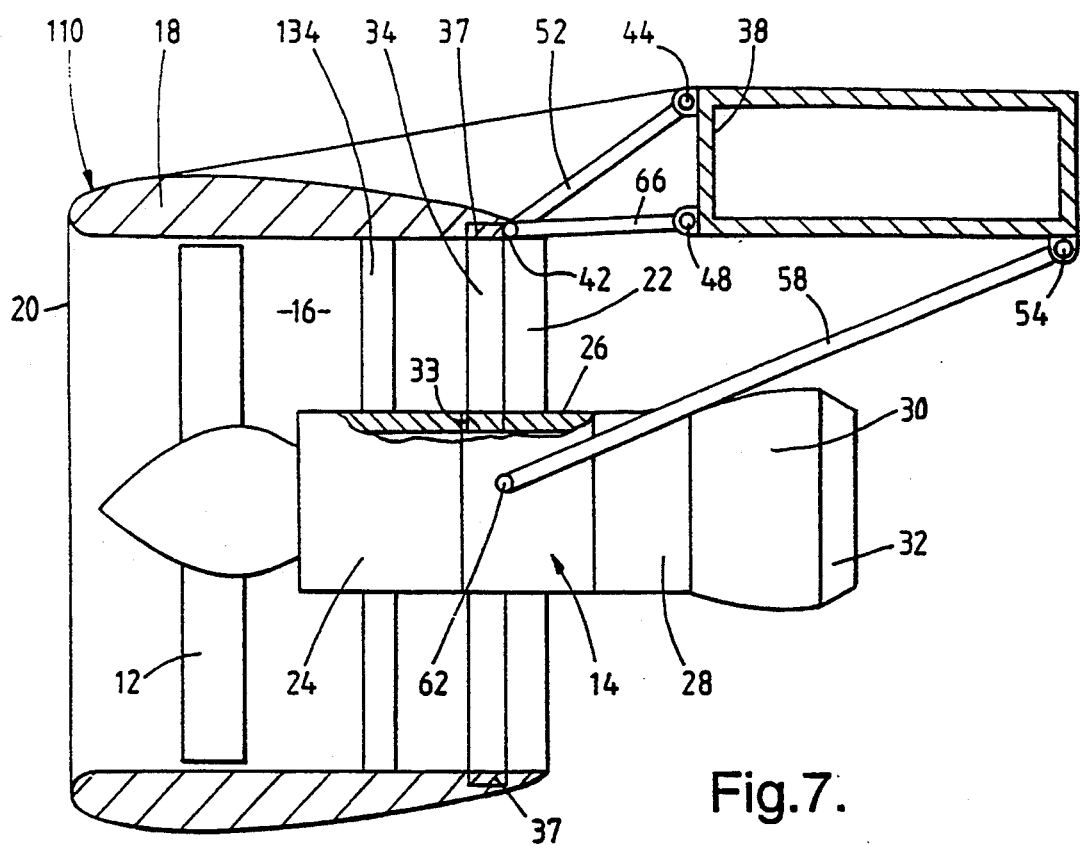
FIG. 7 is a longitudinal part cross-sectional view through an alternative turbofan gas turbine engine having a mounting according to the present invention.

In FIG. 7 a set of outlet guide vanes 134 is provided and a set of spokes 34 is provided downstream of the outlet guide vanes 134. The spokes 34 have a chord length similar to conventional outlet guide vanes. In this case the hard points will still be at the radially outer ends of two adjacent spokes 34. By arranging the outlet guide vanes 134 and the spokes 34 a suitable axial distance apart a suitably stiff rigid frame is produced.

Figure 9:
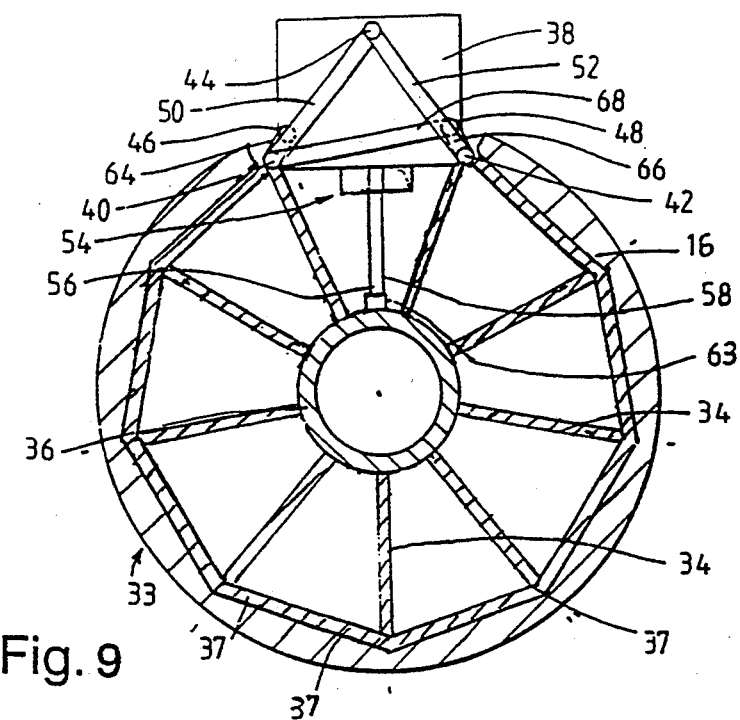
FIG. 9 is a cross-sectional view in the direction of arrows C—C in FIG. 8.
Figure 8:
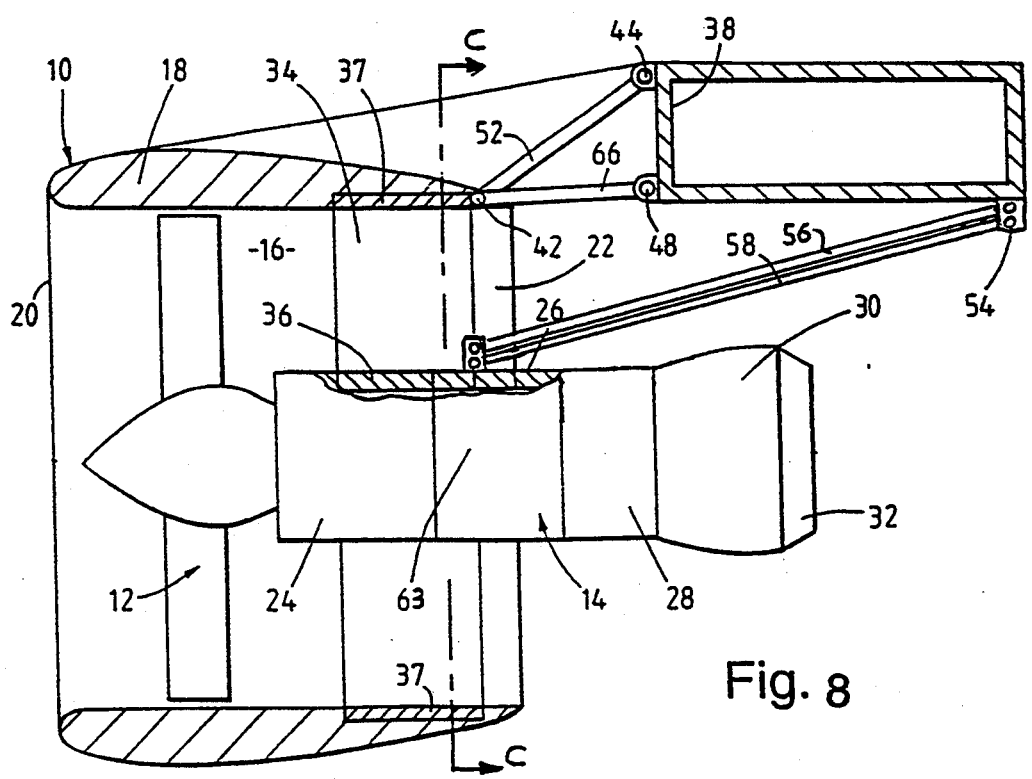
FIG. 8 is a longitudinal cross-sectional view through an alternative turbofan gas turbine engine having a mounting according to the present invention.

As a further alternative the links 56 and 58 may be connected to the brackets at hard points at the radially inner ends of spokes 34A and 34B. In a further variant, as shown in the 9-spoke variant of FIGS. 8 and 9, the links 56 and 58 may be connected to a bracket at a hard point 63 between the spokes 34A and 34B in the plane containing the engine axis and the brackets 44 and 54. In this case the links 56 and 58 are arranged in the plane containing the engine axis and the brackets 44 and 54, and the links 56 and 58 may be arranged one coaxially within the other or side by side.

Thus it can be seen that no "A" frames are required between the fan casing and the core casing and a downstream mounting is not required on the core casing.

We claim:

1. A mounting for coupling a turbofan gas turbine to an aircraft structure for reacting side, axial, vertical, yaw, and thrust loads and pitch and roll couples, the turbofan gas turbine including an axis, a core engine and a fan, the core engine having a compressor, a combustor, a turbine and a core casing, the fan operating within a fan duct defined in part by a fan casing, the mounting comprising:

a rigid frame defined by a hub member, a plurality of angularly spaced spokes secured at their radially inner ends to and extending radially outwardly from the hub member and an annular member secured to the radially outer ends of the spokes, the annular member secured to the fan casing and the hub member secured to the core casing, a first set of three attachment points on the aircraft structure, a second set of attachment points at an axial position on the aircraft structure different from the axial position of the first set of attachment points, the second set of attachment points having at least one attachment point, a first one of the attachment points in the first set of attachment points and the at least one attachment point in the second set of attachment points being arranged substantially in a plane containing the axis of the turbofan gas turbine engine and the first one of the attachment points of the first set of attachment points being positioned axially upstream of the at least one attachment point of the second set of attachment points, first connecting means connecting the radially outer ends of two adjacent spokes of the rigid frame with the first set of attachment points on the aircraft structure, the first connecting means comprising a first link connecting the first one of the attachment points of the first set of attachment points and the radially outer end of one of the two adjacent spokes, a second link connecting the first one of the attachment points of the first set of attachment points and the radially outer end of the other of the two adjacent spokes, a third link connecting a second one of the attachment points of the first set of attachment points and the radially outer end of the one spoke, a fourth link connecting a third one of the attachment points of the first set of attachment points and the radially outer end of the other of the two adjacent spokes, and a fifth link connecting the second one of the attachment points of the first set of attachment points and the radially outer end of the other of the two adjacent spokes, the first connecting means together with the rigid frame and the aircraft structure defining structure to react to the side, axial, vertical, and yaw loads and roll couplings, and second connecting means connecting the rigid frame with the second set of attachment points, the second connecting means comprising linkage means connected between the at least one attachment point of the second set of attachment points and a radially inner end of at least one spoke of the rigid frame, the second connecting means together with the rigid frame and the aircraft structure defining structure to react thrust loads and pitch couples.

2. A mounting as claimed in claim 1 wherein the rigid frame is removably connected to the first connecting means at the radially outer ends of the two adjacent spokes.

3. A mounting as claimed in claim 1 wherein the second connecting means is removably connected to the aircraft structure at the aircraft structure.

4. A mounting as claimed in claim 1 wherein the spokes are equi-angularly spaced.

5. A mounting as claimed in claim 1 wherein the spokes are outlet guide vanes.

6. A mounting as claimed in claim 5 wherein the outlet guide vanes have a chord length of at least 48 inches.

7. A mounting as claimed in claim 1 wherein there are seven outlet vanes having a chord length of about 72 inches.

8. A mounting as claimed in claim 1 wherein there are eight outlet vanes having a chord length of about 60 inches.

9. A mounting as claimed in claim 1 wherein there are six vanes having a chord length of about 84 inches.

10. A mounting as claimed in claim 1 wherein the annular member comprises a plurality of members, each member being substantially straight in a direction peripherally of the fan casing and connects the radially outer ends of two adjacent spokes to define a polygonal rigid frame.

11. A mounting as claimed in claim 1 wherein the at least one attachment point of the second set of attachment points connects with the radially inner ends of two spokes.

12. A mounting as claimed in claim 11 wherein the two spokes with which the at least one attachment point of the second set of attachment points connects are other than said two adjacent spokes secured at their radially outer ends to the first connecting means.

13. A mounting as claimed in claim 11 wherein the two spokes with which the second connecting means are connected are in a plane perpendicular to the plane containing the engine axis and the first one of the attachment points of the first set of attachment points and the at least one attachment point of the second set of attachment points on the aircraft structure.

14. A mounting as claimed in claim 1 wherein the linkage means comprises a sixth link connecting the at least one attachment point of the second set of attachment points and the radially inner end of one of the two spokes, and a seventh link connecting the at least one attachment point of the second set of attachment points and the radially inner end of the other of the two spokes.

15. A mounting as claimed in claim 1 wherein the aircraft structure is a stub pylon extension.

16. A mounting as claimed in claim 1 wherein the aircraft structure is a wing box.

17. The mounting as claimed in claim 1 wherein the linkage means connects with two spokes having radially inner ends in a plane perpendicular to the plane containing the engine axis and the first one of the attachment points and the at least one attachment point of the second set of attachment points on the aircraft structure.

18. The mounting as claimed in claim 1 wherein the second and third attachment points of the first set of attachment points are arranged angularly on opposite sides of the plane containing the engine axis and the first attachment point of the first set of attachment points and the at least one attachment point of the second set of attachment points.

19. The mounting as claimed in claim 1 wherein the second and third attachment points of the first set of attachment points are radially closer to the engine axis than the first attachment point.

20. A mounting for coupling a turbofan gas turbine to an aircraft structure for reacting side, axial, vertical, yaw, and thrust loads and pitch and roll couples, the turbofan gas turbine including an axis, a core engine and a fan, the core engine having a compressor, a combustor, a turbine and a core casing, the fan operating within a fan duct defined in part by a fan casing, the mounting comprising:
   a rigid frame defined by a hub member, a plurality of angularly spaced spokes secured at their radially inner ends to and extending radially outwardly from the hub member and an annular member secured to the radially outer ends of the spokes, the annular member secured to the fan casing and the hub member secured to the core casing,
   a first set of three attachment points on the aircraft structure,
   a second set of attachment points at an axial position on the aircraft structure different from the axial position of the first set of attachment points, the second set of attachment points having at least one attachment point,
   a first one of the attachment points in the first set of attachment points and the at least one attachment point in the second set of attachment points being arranged substantially in a plane containing the axis of the turbofan gas turbine engine and the first one of the attachment points of the first set of attachment points being positioned axially upstream of the at least one attachment point of the second set of attachment points,
   first connecting means connecting the radially outer ends of two adjacent spokes of the rigid frame with the first set of attachment points on the aircraft structure, the first connecting means comprising a first link connecting the first one of the attachment points of the first set of attachment points and the radially outer end of one of the two adjacent spokes, a second link connecting the first one of the attachment points of the first set of attachment points and the radially outer end of the other of the two adjacent spokes, a third link connecting a second one of the attachment points of the first set of attachment points and the radially outer end of the one spoke, a fourth link connecting a third one of the attachment points of the first set of attachment points and the radially outer end of the other of the two adjacent spokes, and a fifth link connecting the second one of the attachment points of the first set of attachment points and the radially outer end of the other of the two adjacent spokes, the first connecting means together with the rigid frame and the aircraft structure defining structure to react to the side, axial, vertical, and yaw loads and roll couplings, and
   second connecting means connecting the hub member of the rigid frame with the second set of attachment points, the second connecting means comprising linkage means connected between the at least one attachment point of the second set of attachment points and a point on the hub member between the two adjacent spokes and in the plane containing the engine axis, the first one of the attachment points of the first set of attachment points, and the at least one attachment point of the second set of attachment points, the second connecting means together with the rigid frame and the aircraft structure defining structure to react thrust loads and pitch couples.

21. The mounting as claimed in claim 20 wherein the linkage means of the second connecting means comprises a sixth link and a seventh link arranged side by side in the plane.

22. A mounting as claimed in claim 20 wherein there are nine outlet vanes having a chord length of between forty-eight and sixty inches.

* * * * *